(No Model.)
J. W. HUDSON.
CULTIVATOR.
No. 250,361. Patented Dec. 6, 1881.
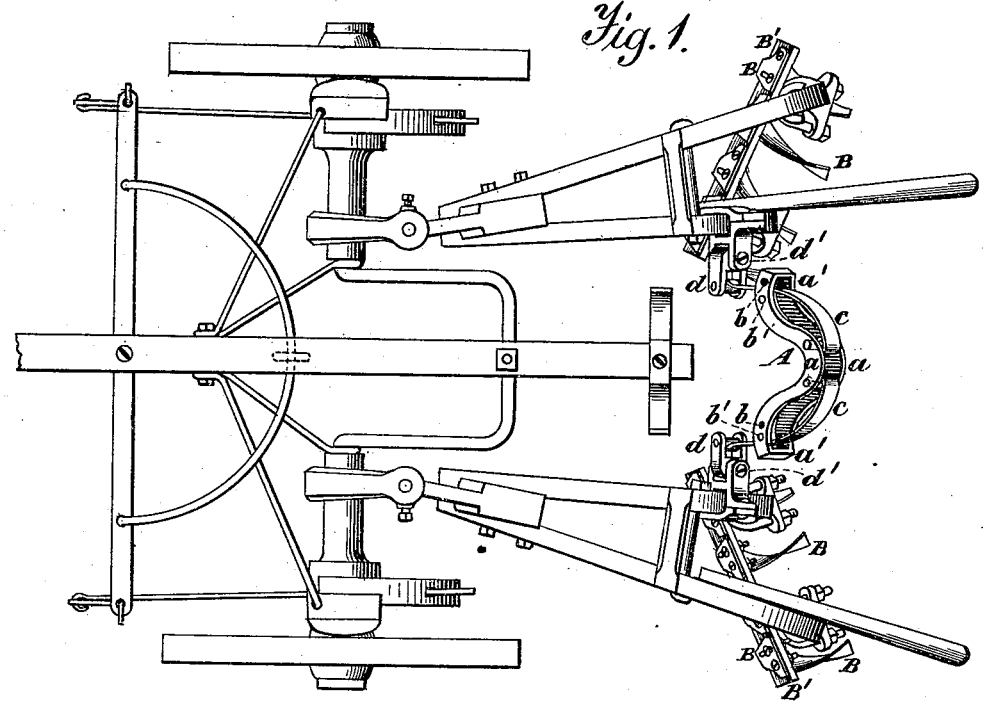
Fig. 1.
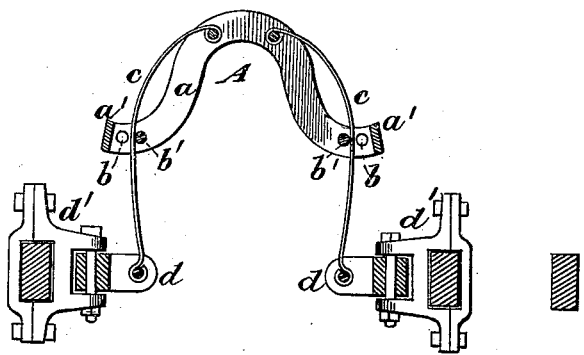
Fig. 2.
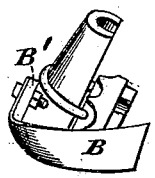
Fig. 4.
Fig. 3.
Fig. 5.
Witnesses.
A. Ruppert
H. Bernhard
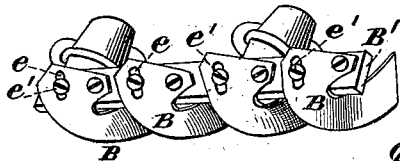
Inventor.
John W. Hudson
By his Att'ys
Edson Bros.

UNITED STATES PATENT OFFICE.

JOHN W. HUDSON, OF WELLINGTON, ILLINOIS.

CULTIVATOR.

SPECIFICATION forming part of Letters Patent No. 250,361, dated December 6, 1881.

Application filed July 27, 1881. (No model.)

*To all whom it may concern:*

Be it known that I, JOHN W. HUDSON, a citizen of the United States of America, residing at Wellington, in the county of Iroquois and State of Illinois, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a plan view of my improved wheel-cultivator. Fig. 2 is a side elevation thereof, and Fig. 3 is a sectional elevation of the same. Figs. 4 and 5 are detail views of the yoke and the shovels.

This invention has reference to that class of cultivators termed "wheel-cultivators," having relation to improvements upon my patent, dated July 6, 1880, No. 229,534, which contemplate the universal adjustment of the plow-beams and the more effectual working of the plants, and the desired adjustment of the shovels which perform the latter operation; and it consists in the employment of certain mechanism and the form of the corn or plant shovels and their manner of adjustment, substantially as hereinafter more fully set forth.

In carrying out my improvements I employ, as will be observed by reference to the accompanying drawings, a yoke, A, in connection with the shovel or plow beams, to effect the adjustment thereof, as presently set forth, their connection and adjustment to the axle and the draft attachment between the tongue and the axle for governing the depth of penetration of the plows into the ground, all being the same as that shown and described in my aforesaid patent, granted July 6, 1880, and numbered 229,534. The yoke A is composed of a rigid metal U-shaped frame, $a$, having its extremities curved or extended outwardly, forming staple-like devices $a'$. Through the sides of these staples $a'$ are made perforations, a series, $b$, being provided in each. Connected to opposite points in the center of the frame or bow $a$, are metal straps $c$, reaching down and connecting to laterally-swiveled clips $d$, connected to similar fixed clips $d'$, fastened upon the cultivator-shovel beams. Through the holes $b$ are inserted adjusting-pins $b'$, the object of which is to hold the beam-connecting straps $c$ closer together or farther apart, as may be desired, to suit the width of the rows of corn being cultivated. It will be noticed that the straps or springs and the frame will prevent the beams spreading too far apart, and at the same time enable them to be brought together, so as to cause the plows or shovels to cut out the weeds between the hills of corn or other plants. The springs or straps being swiveled to the beams, as above described, the latter are enabled to be so manipulated as to "dodge" or avoid the rows of corn in passing between them crosswise to the direction in which they (the corn or seed) were planted.

The second part of my invention consists in the construction and adjustment of the shovels for cultivating the corn or other plants. These shovels are composed each of a share or plate, B, with its forward end turned upward, and pivoted at one corner to the cross-bar $B'$, bolted to the beam. The plate or shovel is curved rearwardly and presented obliquely at one side to the ground, so as to enable it to take up the dirt at its forward end and deliver it at its rear end upon the plant. Arranging a number of these shovels in a row parallel to, and with the proper intervals between each other, as shown, it will be seen that the furrow formed by one in throwing dirt upon the plant will be filled by the succeeding plow or shovel, thus filling up and leveling ground while cultivating the plants. The shovels can be so adjusted as to vary their inclination to the ground or the plants by means of slots $e$, made in the unpivoted corners of the plows or shovels, which receive adjusting-screws $e'$, projecting from the cross-bar $B'$. This permits of throwing more or less dirt around the plants. The other plows of the opposite beam are the same as described above.

Having thus fully described my invention, I claim and desire to secure by Letters Patent—

1. In a cultivator, the combination, with the beams, of the universally-jointed yoke A, having springs connecting it to the said joints, substantially as and for the purpose set forth.

2. In a cultivator, the combination, with the beams, of the yoke A, composed of the frame a, having the springs or straps c, substantially as and for the purpose set forth.

3. In a cultivator, the combination, with the beams, of the yoke A, composed of the frame a, provided with the perforated lateral extended portions a', having the adjusting-pin b', and the straps or springs c, substantially as and for the purpose set forth.

4. In a cultivator, the combination, with the beams having the swiveled clips d and fixed clips d', of the yoke A a, having the springs or straps c, substantially as and for the purpose set forth.

5. In a cultivator, the combination, with the foot-bar B', of the shovels B, of the shape shown and described, each turned upward at its front end and curved rearwardly, with one side presented obliquely to the ground and pivoted at one corner to the bar, and provided at its other corner with a slot and adjusting-screw, substantially as and for the purpose set forth.

In testimony whereof I affix my signature in presence of two witnesses.

JOHN W. HUDSON.

Witnesses:
H. Z. MALO,
G. R. PRATT.